United States Patent [19]

Markowski

[11] Patent Number: 4,754,958

[45] Date of Patent: Jul. 5, 1988

[54] MOTION SNUBBER

[75] Inventor: Edwin P. Markowski, Medfield, Mass.

[73] Assignee: Barry Wright Corporation, Newton Lower Falls, Mass.

[21] Appl. No.: 824,482

[22] Filed: Jan. 31, 1986

[51] Int. Cl.$^4$ .......................... F16M 7/00; F16F 15/04; B64C 27/00; F04B 39/10

[52] U.S. Cl. ..................... 267/140; 244/17.27; 267/141.1; 267/292; 416/140; 416/500

[58] Field of Search ............ 267/116, 136, 141, 141.1, 267/141.2, 141.3, 152, 153, 63 R, 63 A, 139, 140, 140.1, 140.3, 140.4, 140.5, 141.7, 134; 188/379, 381; 244/17.24, 110 R, 17.27, 17.11; 74/574; 248/560, 635; 416/500, 140 R, 140 A, 145

[56] References Cited

U.S. PATENT DOCUMENTS

| | | | |
|---|---|---|---|
| 2,660,423 | 11/1953 | Roy | 267/152 |
| 2,949,254 | 8/1960 | Bauer | 244/17.27 |
| 2,987,291 | 6/1961 | Dyson | 267/140.3 |
| 3,223,400 | 12/1965 | Deister | 267/152 |
| 3,257,969 | 6/1966 | Thomas | 267/57.1 A |
| 3,480,268 | 11/1969 | Fishbaugh | 267/141.1 |
| 3,504,902 | 4/1970 | Irwin | 267/152 |
| 3,511,492 | 5/1970 | Galbato | 267/152 |
| 3,606,295 | 9/1971 | Appleton | 267/141.1 X |
| 3,666,301 | 5/1972 | Jorn | 267/57.1 A |
| 3,831,922 | 8/1974 | Appleton | 267/152 |
| 4,098,001 | 7/1978 | Watson | 33/169 C |
| 4,105,266 | 8/1978 | Finney | 267/152 |
| 4,108,508 | 8/1978 | Clinard | 267/57.1 R |
| 4,256,354 | 3/1981 | Peterson | . |

FOREIGN PATENT DOCUMENTS

| | | | |
|---|---|---|---|
| 0321002 | 10/1929 | United Kingdom | . |
| 0392704 | 5/1933 | United Kingdom | . |
| 0423134 | 1/1935 | United Kingdom | . |
| 0522853 | 6/1940 | United Kingdom | 267/141.1 |
| 0775866 | 5/1957 | United Kingdom | . |
| 0974210 | 11/1964 | United Kingdom | . |
| 1080209 | 8/1967 | United Kingdom | . |
| 1157451 | 7/1969 | United Kingdom | . |
| 1380710 | 1/1970 | United Kingdom | 244/17.27 |
| 1270021 | 4/1972 | United Kingdom | . |
| 1431010 | 4/1976 | United Kingdom | . |
| 0979752 | 12/1982 | U.S.S.R. | 267/136 |

Primary Examiner—Andres Kashnikow
Assistant Examiner—Robert J. Oberleitner
Attorney, Agent, or Firm—Milton E. Gilbert; James W. Mitchell

[57] ABSTRACT

A motion snubber comprises layers of elastomeric and substantially inextensible material stacked one on top of the other between a base and mounting plate, and is characterized by a rigid restraining pin disposed in a bore within the stack so as to restrain deformation of the elastomer. In one embodiment the bore is obliquely oriented with respect to the pin. In another embodiment the pin is contoured to accommodate angular motion.

16 Claims, 6 Drawing Sheets

MOTION SNUBBER

BACKGROUND OF THE INVENTION

The present invention relates generally to a motion snubber and more particularly to one suitable for use between the main rotor hub and mast of a teeter rotor helicopter.

Teeter rotors have two linearly aligned blades which teeter or wobble as they spin due to aerodynamic forces of flight. Technically, this is known as "flapping", a term which can be defined as the tilting of the plane of rotation of the rotor blades relative to the helicopter. Unlike other known rotor systems presently used, the teeter rotor's hub also flaps, sometimes dangerously close to the mast which links it to the helicopter. Under certain extreme conditions the spinning rotor hub flaps too far and cuts into the mast. This can and usually does have catastrophic consequences.

Mast bumping by the rotor can best be explained more fully with reference to the illustrations of FIGS. 1A through 1C which depict a mast bumping sequence.

As shown in FIG. 1A, during normal flight the free-floating main rotor 10, including blades 12 and 14 and hub 16, spins with a vertical flapping component of motion. A safety clearance exists between the rotor hub 16 and the mast 18. Teeter rotors and masts are designed to accommodate, for example, plus or minus five degrees of flap, but normally remain within much narrower flight limits, for example, plus or minus four degrees. Near the boundaries of the flight envelope, operational limits of flight set by the helicopter manufacturer, the flapping can result in the base of the main rotor 10 exceeding these angles and actually contacting the mast 18 as in FIG. 1B. Severe or repeated bumping of the hollow mast by the rotor 10 dents or crimps it. Such deformation is illustrated in FIG. 1C. Once mast bumping begins an unstable condition results in which the mast 18 is bumped repeatedly, first on one side and then the other. Some have even surmised that this can lead to a fracturing of the mast 18.

Various techniques to avoid or lessen the consequences of mast bumping have been suggested. These include: refitting the teeter rotor helicopter with three or four blades hinged to the rotor hub, providing thicker-walled masts, equipping the aircraft with gauges such as a G-meter and sideslip indicator to alert the pilot of the onset of unsafe flight conditions, and/or utilizing a device which can variously be called a motion snubber, bumper or hub spring between the rotor hub and the mast to restrain flapping.

The use of motion snubbers appears to be a viable technique. The motion snubber would serve to restrain flapping by resiliently cushioning the impact of the rotor hub. With appropriate design of the motion snubber, the pilot of the aircraft might be able to "feel" the impact of the rotor hub against the motion snubber and thus, act to avoid a major mishap.

Desirable would be a motion snubber designed so that it can be accommodated on teeter rotor helicopters without substantial redesign of the helicopter. Full rotor hub replacement to accommodate motion snubbers would be extremely costly. Preferable would be a snubber design which could be an "add-on" to existing rotor hub designs and yet meet the severe space envelope, motion accommodating and load carrying requirements which an add-on refit would entail.

SUMMARY OF THE INVENTION

It is an object of the invention to provide a motion snubber suitable for use between the main rotor hub and mast of a teeter rotor helicopter.

A further object of the invention is to provide a motion snubber of a design which enables it to meet the strict space envelope, motion accommodating and load carrying requirements as further described hereinafter.

Still another object of the invention is to provide a motion snubber which can resiliently cushion higher loads through larger deflections while maintaining column stability.

Yet another object of the invention is to provide a motion snubber which exhibits a predetermined or regulated deflection in both horizontal and vertical directions in response to relative angular and cyclic or recurrent motion.

These and other objects of the invention are met by the preferred embodiment of the invention which provides a motion snubber of alternating and bonded together layers of elastomeric material and substantially inextensible material which are stacked one atop another between a mounting plate at one end and a resilient load-contacting surface at the other. The device further includes a rigid restraining pin extending from approximately one end of the laminated stack toward but not to the other end when the motion snubber is unloaded. The restraining pin is adapted and configured to penetrate through successive openings in at least some of the layers under compressive loads applied to the load contacting surface, and, importantly, to limit lateral deflection of the stack and bulging of the elastomeric layers.

According to the preferred embodiment, the load-contacting surface is not parallel to the mounting surface when the motion snubber is unloaded, and the openings in the layers are configured and disposed so as to accommodate a predetermined relative angular displacement of the load contacting surface relative to the mounting plate about a remote and off-set pivot point prior to the restraining pin contacting the walls of the openings. The preferred configuration of the openings is such as to together define a obliquely oriented bore having cross-sections which vary along the bore's length, from circular through variously sized rectangular cross-sections, and which do not necessarily have coincident axes In another version of the invention the restraining pin itself is configured or contoured to additionally accommodate a predetermined angular motion of the load contacting surface relative to the mounting plate before the pin contacts the walls of the openings. According to this version the restraining pin has for example an ungular shape, as more fully described below, and the bore has a generally cylindrical configuration.

Other versions of a motion snubber made in accordance with the invention include the use of an outboard restraining wall to additionally limit elastomeric bulging and lateral column deflection of the stack, and/or the use of a plurality of restraining pins in a single motion snubber.

In use, at least two such motion snubbers would be mounted on a bracket secured to the mast of a teeter rotor helicopter and circumferentially spaced one from another about the mast. A striking plate incorporated into the rotor hub would impact the load contacting surface of the motion snubber at predetermined flapping limits as the rotor spun recurrently compressing the motion snubber through resilient deformation of the elastomeric layers. The restraining pin or pins would lace through successive layers in the stack. Lateral deflection and elastomeric bulging would be limited by the laminated nature of the motion snubber, the restraining pin or pins, and, if utilized, the restraining wall. Elastic restoration forces in the elastomeric layers would return the motion snubber to its unloaded height once the load were removed.

Other objects and features of the invention are described or rendered obvious by the following detailed discussion of the preferred embodiment of the invention and the accompanying drawings.

DETAILED DESCRIPTION OF THE PREFERRED EMBODIMENT

A. Rotor/Mast Assembly

Figure 1A:
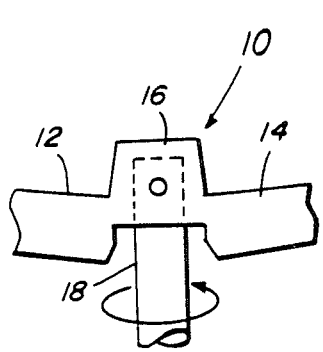
FIGS. 1A through 1C are illustrations of a prior art teeter rotor and mast of a helicopter during a mast bumping sequence.
Figure 1B:
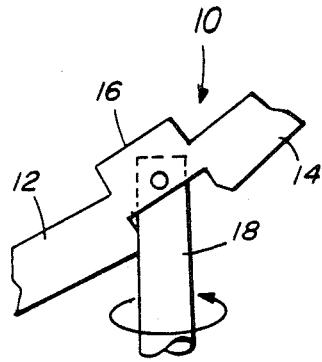
Figure 1C:
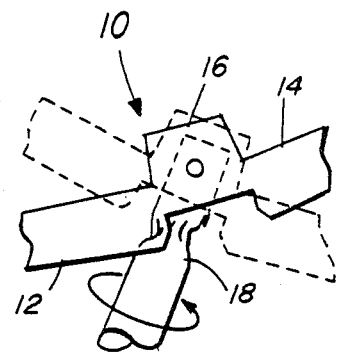
Figure 2:
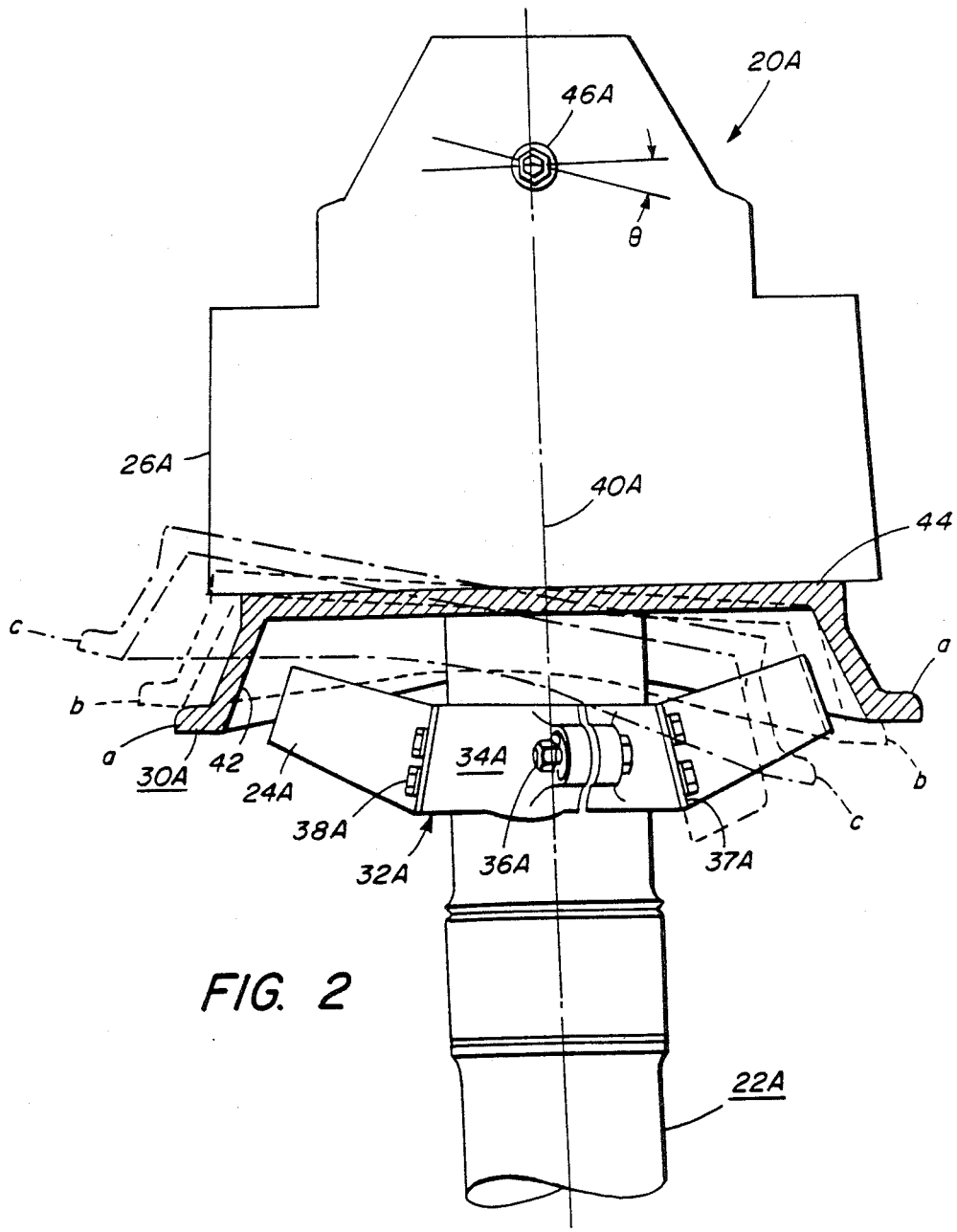
FIGS. 2 and 3 are partial elevational views of a helicopter rotor and mast equipped with motion snubbers in accordance with the present invention.
Figure 3:
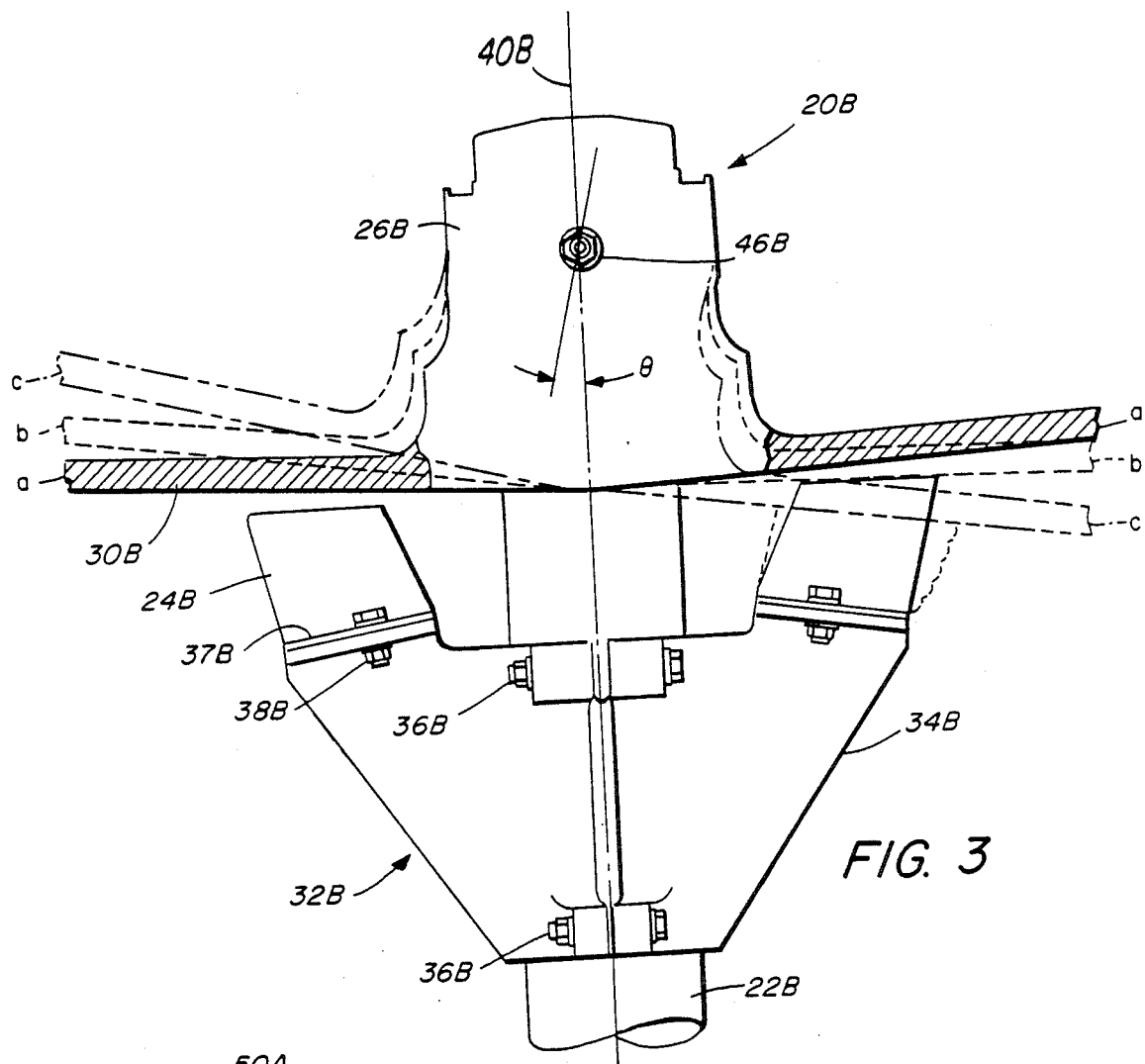

Referring to FIGS. 2 and 3, alternative designs for a helicopter rotor 20A, 20B and mast 22A, 22B are shown, equipped with motion snubbers 24A, 24B, respectively, in accordance with the invention. The rotor 20A, 20B includes a rotor hub 26A, 26B, and blades (not shown in these figures) and is mounted for rotation with the mast 22A, 22B. A teeter rotor employs two coaxial blades. it should be recognized that the rotor hub 26A, 26B has been greatly simplified for purposes of ease in conveying what is regarded as the invention. Features not illustrated play no direct role in the invention and yet will be appreciated by those skilled in the art. The rotor hub 26A, 26B has at its base a striking block, surface, plate or portion which shall be referred to as striking plate 30A, 30B. The striking plate 30A, 30B is fixedly secured to the rest of the rotor hub 26A, 26B. The motion snubbers 24A, 24B are mounted for rotation with the mast 22A, 22B by a clamping bracket 32A, 32B such as a split ring collar 34A, 34B, secured about the mast 22A, 22B by fastener means 36A, 36B, nuts and bolts for example. The motion snubbers 24A, 24B are fixedly and preferably removably mounted on a mounting base portion 37A, 37B of the clamping bracket 32A, 32B by means of mechanical fasteners such as screws shown at 38A, 38B.

In operation the rotor/mast assembly rotates about an axis designated 40A, 40B which is the centerline of the rotor/mast assembly. Additionally, as explained hereinabove, the rotor teeters or flaps as it spins through an angle between positive and negative theta (0) (which can be termed the maximum flapping angle) tracing through a sinusoidal pattern in its motion. As the rotor 20A, 20B does so, the striking plate 30A, 30B likewise teeters or flaps toward and away from the motion snubbers 24A, 24B. To aid in understanding this, pictured in these figures are three angular positions "a", "b", and "c" of the striking plate 30A, 30B (although it should be appreciated that the striking plate 30A, 30B can lie at any angle between positive and negative theta (0). In position "a" the striking plate is level or horizontal. The flapping angle is zero. In this position, a clearance exists between the striking plate 30A, 30B and the motion snubbers 24A, 24B. The striking plate 30A, 30B and the rest of the rotor 20A, 20B rotate with a circular motion without wobble or flap. In position "b" the flapping angle is intermediate zero and the maximum flapping angle, preferably, approximately five degrees. The striking plate 30A, 30B flaps as it rotates, swinging angularly so as to contact one of the motion snubbers 24A, 24B, as pictured, and, of course, no clearance therebetween is present. In position "c" the angular displacement correspondes to the maximum flapping angle, for example, twelve degrees, and the striking plate 30A, 30B not only contacts but compresses the motion snubber 24A, 24B. The motion snubber 24A, 24B in this position deflects axially or shortens as well as bulges laterally. This is shown on the right side of FIGS. 2 and 3 in the phantom views of the motion snubbers 24A, 24B and shall be explained more fully hereinbelow. From the relationship of the parts when the striking plate is in positions "b" and "c", the striking plate 30A, 30B can be understood to impart a load onto the motion snubber 24A, 24B. The direction of the load depends on the position of the striking plate 30A, 30B along its arc of swing. The direction of the force imparted in position "b" is very different from that imparted in position "c".

In FIG. 3 the striking plate 30B is shown as being substantially flat or planar along its undersurface which contacts the motion snubber 24B, and extending in its level position "a" substantially perpendicularly to axis 40B. (Actually striking plate 30B as shown bends slightly upward from its midpoint so as to have a chevron shaped cross-section, though the included angle is nearly 180 degrees.) As it flaps through its various positions it applies a load to motion snubber 24B in a direction which, although fluctuating, forms an acute angle relative to a line parallel to axis 40B. Thus, the loading is substantially vertical and parallel to the centerline of the rotor/mast assembly. That is why the angle theta (0) in this figure is shown as measured relative to a datum coincident the axis 40B. This is unlike that of the embodiment of FIG. 2 in which the loading of its motion snubber is and remains substantially horizontal or perpendicular to the rotor/mast assembly's centerline, axis 40A.

In FIG. 2 the striking plate 30A includes a downwardly extending flange 42 of a circular cross-section connected at an angle equal to or greater than 90 degrees at its top end to a flat plate 44. Thus, it is concave and forms a cup, opening away from the rest of the rotor hub 26A. In operation, the motion snubber 24A becomes disposed within the cup-shaped striking plate 30A and contacts flange 42 when the striking plate 30A is in position "b". Because of this configuration, the loading is, as stated above, substantially horizontal at all flapping angles of the striking plate 30A. That is why the angle theta (0) in this figure is shown as measured relative to a datum perpendicular to the centerline, axis 40A.

Of importance to an understanding of the invention is the relative position of the pivot point 46A, 46B about which the flapping occurs and, consequently, about which the striking plate 30A, 30B swings. Note that it is remote and offset from the points of contact between the motion snubber 24A, 24B and the striking plate 30A, 30B. The pivot point 46A, 46B is disposed at the intersection of axis 40A, 40B and the centerline of the helicopter blades (not shown). This too shall be more fully discussed below and has direct bearing on the design of the motion snubbers 24A, 24B made in accordance with the invention.

B. Motion Snubber

Figure 4:
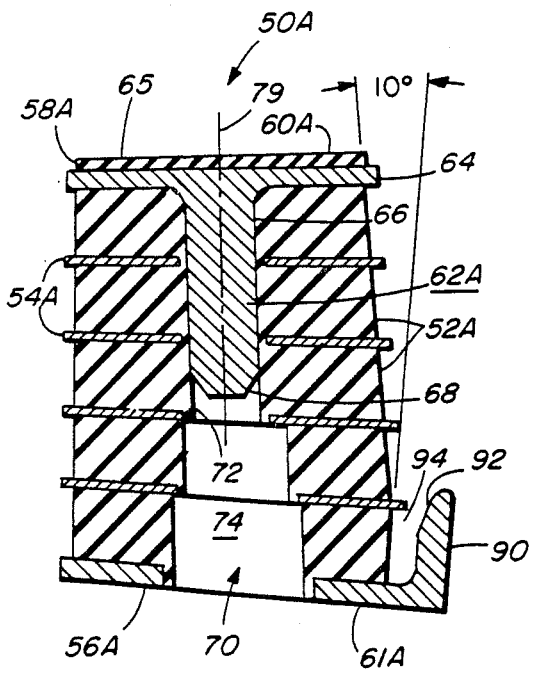
FIGS. 4 and 5 are axial cross-sectional views through first and second embodiments, respectively, of a motion snubber according to the present invention, prior to compression.
Figure 5:
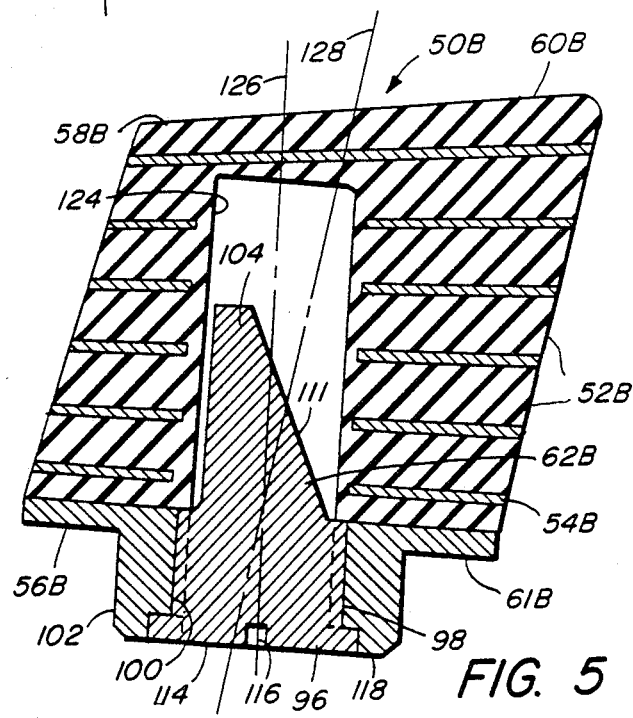

FIGS. 4 and 5 show first and second embodiments of a motion snubber 50A, 50B made in accordance with the invention.

The motion snubber 50A shown in FIG. 4 is adapted for use with rotor/masts assemblies of the type shown in FIG. 2, in which the motion snubber 50A is mounted in a generally horizontal orientation. As such it undergoes a substantially horizontal loading in compression. Designs other than that shown in FIG. 4, however, may be employed in such assemblies without departing from the scope of the invention, as shall become apparent from the following discussion.

In a similar fashion the motion snubber 50B is adapted for use with rotor/masts assemblies of the type shown in FIG. 3 characterized by a substantially vertical orientation and loading in compression of the motion snubber incorporated therein. Designs other than that shown in FIG. 5, however, may be employed in such assemblies without departing from the scope of the invention, as shall likewise become apparent from the discussion which follows.

The motion snubbers 50A, 50B comprise a stack of alternating and bonded together layers of elastomeric material 52A, 52B and substantially inextensible material 54A, 54B which are superposed one atop another between a disk-shaped mounting or base plate 56A, 56B along which the bottom one of the elastomeric layers 52A, 52B is bonded by vulcanization or adhesive at one end, and a resilient layer or head plate 58A, 58B, preferably containing a resilient layer of abrasion-resistant elastomeric or polymeric material, having at its free end a load-contacting surface 60A, 60B. The load contacting surface 60A, 60B in the preferred embodiment, is not parallel to but rather forms an acute angle with respect to a plane parallel to bottom mounting surface 61A, 61B of the mounting plate 56A, 56B. (In FIG. 4 the angle is six degrees while in FIG. 5 it is eight degrees.)

The elastomeric layers 52A, 52B, also known as rubber disks, are made, for example, of a synthetic or natural rubber. The non-extensible layers 54A, 54B, also known as shims, are of a rigid material, preferably metal. The layers are bonded preferably by vulcanization.

Of course, it would be easier to make use of a single rubber molded part of unitary structure but the laminations play a significant role. The compressive load carrying capacity of a block of rubber can be increased several fold by incorporating a plurality of spaced, parallel shims oriented generally perpendicularly to the direction of the anticipated compressive load. This is achieved because the shims act to reduce the ability of the rubber to deflect or bulge in directions traverse to the direction of the load. This is well known to one skilled in the art.

Under compressive loading the motion snubber 50A, 50B undergoes height compression due to elastomeric deformation including bulging of the elastomeric layers and buckling of the stack. These deformations are to be regulated in the practice of the invention so as to tailor the load-deflection curve of the motion snubber.

With the parallel, planar construction of the elastomeric layers 52A, 52B and the non-extensible layers 54A, 54B are shown, under compression the device would tend to buckle, i.e. suffer from column instability. This depends on the weight of the stack, the characteristics of the elastomer and the magnitudes of the load. For example the stack could buckle into a general "C" shape with its middle flaring out to one side.

Another type of undesirable deformation is referred to as "bulging". As a compressive load is applied, shear strains are produced at the edges of the layers. The shear strains result in the extruding of elastomeric material from between the shims. The edge of each of the elastomeric layers 52A, 52B under these conditions would have generally a C-shape. When the elastomer shifts laterally with respect to the axis of the stack its load carrying ability rapidly decreases and it is no longer suitable to carry heavy compressive loads. Excessive bulging can even lead to fatigue failure.

The motion snubber 50A, 50B employs means to restrain or limit lateral deflection of the stack and bulging of the elastomeric layers 52A, 52B. A rigid restraining pin 62A, 62B extends from a position proximate one end of the stack toward but not to the other end when the motion snubber 50A, 50B is not loaded. The restraining pin 62A, 62B is adapted and configured to penetrate or lace through successive openings in at least some of the layers under compressive loads applied to the load-contacting surface 60A, 60B.

Figure 6:
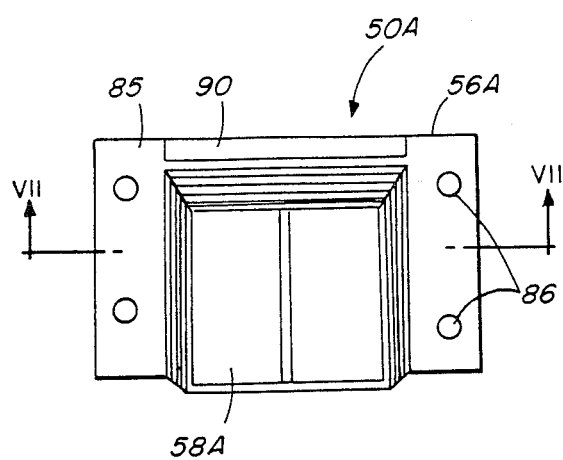
FIG. 6 is a top plan view of the motion snubber of FIG. 4, rotated 90 degrees.
Figure 7:
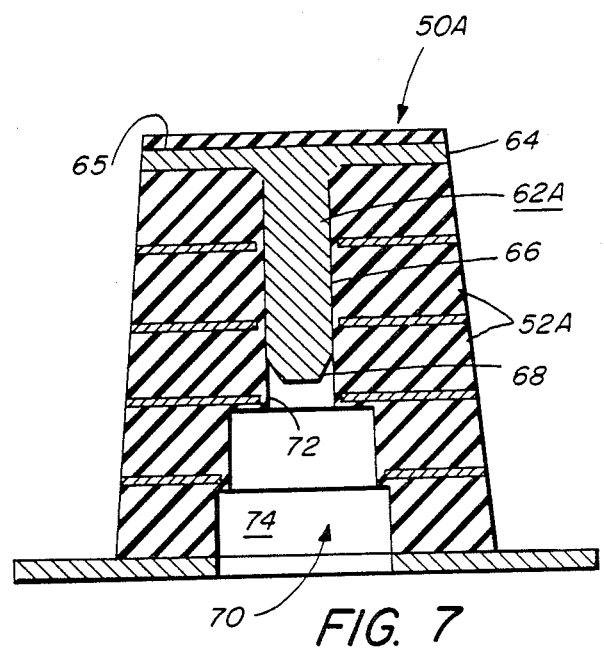
FIG. 7 is an axial sectional view taken along line VII—VII of FIG. 6.

In the embodiment of FIG. 4, which is also shown in FIGS. 6 and 7, the restraining pin 62A includes an anchor plate 64 which serves as one of the substantially inextensible layers 54A and is bonded by vulcanization or adhesive to the resilient plate 58A along the flat top surface 65 of the anchor plate 64, and along its disk-shaped bottom surface to the topmost of the elastomeric layers 52A. It further includes a post portion or projection 66 extending at right angles from the anchor plate 64 in a direction generally toward the mounting plate 56A of the motion snubber 50A. The post portion 66 is in the form of a cylinder having at its distal end a chamfer 68.

At least some, if not all, of the elastomeric layers 52A include an opening 70 through which the pivot portion 66 of restraining pin 62A extends. Each opening 70 is sufficiently aligned wtih adjacent ones so as to form a bore through which the post portion 66 restraining pin 62A can penetrate. For convenience both the openings and the bore shall be designated by the numeral 70. Of importance is the configuration of the bore 70.

Figure 8A:
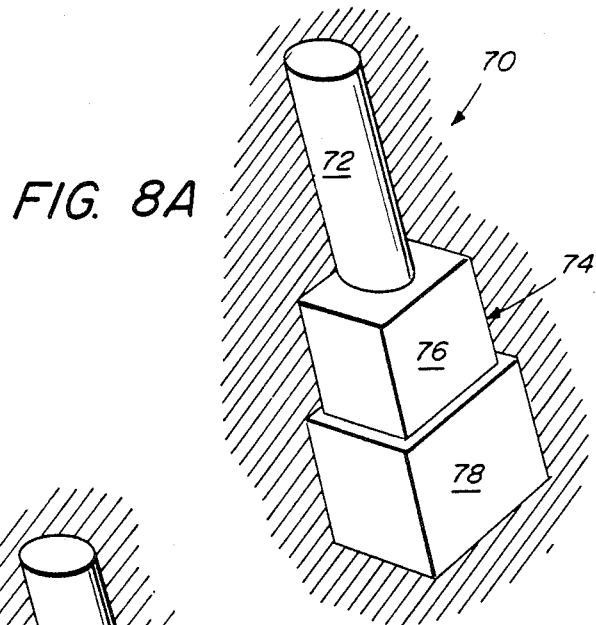
FIGS. 8A and 8B are perspective views of alternative bore configurations for the embodiment shown in FIG. 4.

As illustrated in FIGS. 4, 7 and 8A, the bore 70 is not of uniform cross-section along its length but rather includes, with specific reference to FIG. 8A, a top cylindrical portion 72 of circular cross-section opening along one of its circular ends into a bottom rectilinear portion 74. The bottom rectilinear portion 74 can be pictured as including a plurality of stacked hollow boxes. In other words, it includes at least a first region 76 having a rectangular cross-section of a first area opening onto a second region 78 having a rectangular cross-section of a second and larger area. The centerlines of the first and second regions 76, 78 are such that the effective centerline of bore 70 is oblique with respect to the central axis 79 (shown in FIG. 4) of the motion snubber 50A.

As can be seen in FIGS. 4 and 7, when the motion snubber 50A is unloaded the post portion 66 of the restraining pin 62A extends through the cylindrical top portion 72 of the bore 70. The cylindrical top portion 72 is defined by the combination of each opening 70 in the three top elastomeric layers 52A. During compression the post portion 66 is driven downwardly, lacing successively through the next and final ones of the elastomeric layers 52A, the opening 70 of each defining the so-called "boxes" of the rectilinear potion 74.

The bore 70 is configured to obtain the desired degree of restraint of bulging and buckling through its interaction with the restraining pin 62A.

Figure 8B:
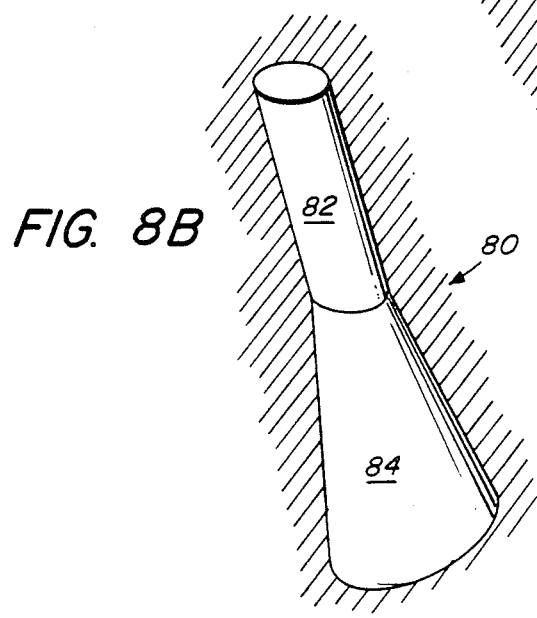

Alternative to the geometry just described for bore 70 is that of bore 80 illustrated in FIG. 8B. Here, a top cylindrical portion 82 of circular cross-section (analogous in function to top cylindrical portion 72) opens to an oblique frusto-conical bottom portion 84 having cross-sections ranging along its length from circular nearest the top portion 82 to oval or elliptical at its other end (analogous in function to rectilinear portion 74).

Turning to other features, as shown in FIG. 6 the mounting plate 56A extends radially (with respect to central axis 79) beyond the stack on first and second oppposite sides thereof and has located in each extension 85 at least one hole 86 (two are shown in each) which is utilzied for securing the motion snubber 50A to the clamping bracket 32A. Also, as can clearly be seen, the stack has a general configuration of an oblique frustum with a rectangular base, with successive layers of successively smaller, generally rectangular shape disposed such that they skew away from the outboard side of the motion snubber 50A. The angle by which they are skewed is shown in FIG. 4 to be approximately 10 degrees. This configuration for the stack is desirable to provide space for deformation of the stack under loading while meeting strict space-envelope restrictions in design.

Further restraint from buckling and bulging is afforded by additionally including an outboard restraining wall 90 which can be fashioned integrally with the mounting plate 56A from which it extends preferably orthogonally upward toward the head plate 58A. At its distal end it has an outward taper 92 which increases the width of a recess 94 defined between the outboard wall 90 and the stack.

In contradistinction to the embodiment just described, in the motion snubber 50B shown in FIG. 5 the restraining pin 62B is contoured to obtain the desired degree of restraint.

Figure 10:
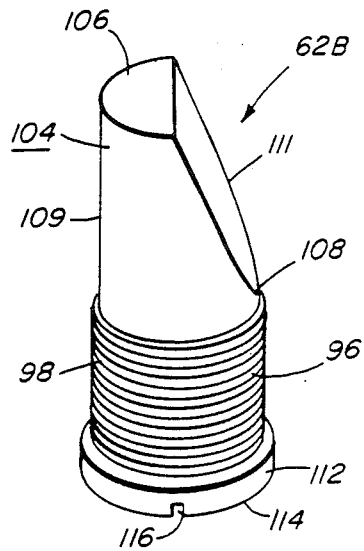
FIG. 10 is a perspective view of the restraining pin of the embodiment of the motion snubber shown in FIG. 5.

In FIG. 5 the restraining pin 62B has an attachment portion 96 having a threaded cylindrical outer wall 98 which threadedly engages the inner wall of a bore 100 defined within a thickened portion 102 of the base plate 56B. The restraining pin 62B further includes a contoured upper portion 104 which can best be appreciated by reference to FIG. 10. This figure is an illustration of the retaining pin 62B which dramatically shows the ungular configuration of the contoured portion 104. It should be remembered from geometry that an "ungula" is a part cut off from a cylinder, cone or the like by a plane oblique to the base. In this case, the contoured portion 104 is of a generally cylindrical shape except for a portion removed therefrom by a plane extending through the top surface 106 and a point 108 proximate the intersection of the outer cylindrical wall 109 and the bottom circular edge 110 nearest the threaded attachment portion 106. This configuration achieves a tapered restraining pin 62B having a flat side inclined surface 111. This view also shows the flange 112 of the attachment portion 96 disposed at its end remote from the contoured portion 104. The flange 112 includes a plate radially extending beyond the threaded wall 98, and has a slot 116 on its distal planar surface 114.

With reference to FIG. 5 once more, the retaining pin 62B is assembled into the motion snubber 50B from the underneath side by screwing the retaining pin 62B into the bore 100 until its bottom surface 114 is flush with the annular bottom surface 118 of the thickened portion 102 of the mounting plate 56B. The slot 116 is adapted and configured to receive a tool (not shown) to aid in this assembly. Proper orientation of the restraining pin 62B is assured by its removability.

Figure 9:
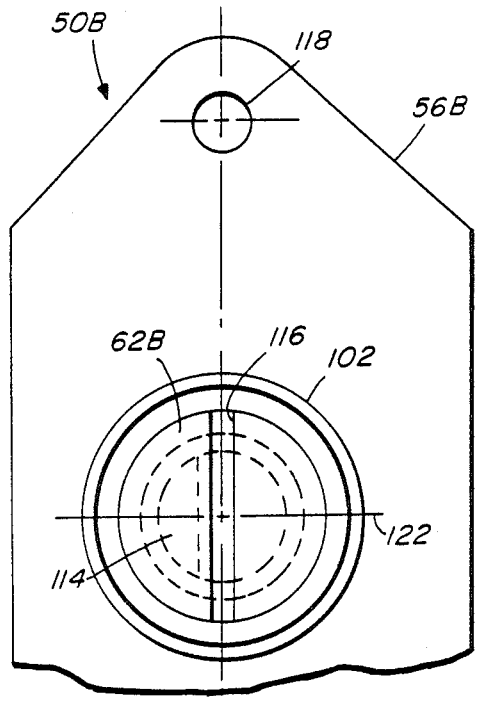
FIG. 9 is a bottom plan view of the motion snubber of FIG. 5.

The mounting plate 56B is shown in FIG. 9 to include, at a distance on either side of the retaining pin 62B sufficient to clear the stack, at least one hole 118. (One is shown though the one on the other side can be appreciated since the mounting plate 56A of this embodiment is substantially symmetrical about the horizontal axis designated 122.)

Again with regard to FIG. 5, the contoured portion 104 of the restraining pin 62B extends into a bore 124 preferably of cylindrical configuration, defined within the stack by the elastomeric and non-extensible layers 52B, 54B. Of importance is that the centerline 126 of the bore 124, and the through-bore 100 in the mounting plate 56B with which it is coaxial, is not coincident with but rather forms an acute angle with respect to the centerline 128 of the motion snubber 50B. As a result of this, more elastomer is disposed in the elastomeric layers to the right (in this FIG. 5) of the bore 124, which is intended to be the outboard side, than to the left of the bore 124. The restraining pin 62B is oriented within the bore 124 so that the flat side surface 111 presents toward the right. In so doing, during compression of the motion snubber 50B, the larger elastomer volumes of the portions of the elastomeric layers 52B to the right of the bore 124 have a larger volume of the bore in which to bulge before contacting the restraining pin 62B.

Thus, the asymmetrical nature of the elastomeric layers 52B about a uniformly cross-sectioned bore 124 in combination with a contoured restraining pin 62B function in concert in a fashion similar to that of the motion snubber 50A pictured in FIG. 4 in which the bore's configuration is crafted to achieve the desired degree of bulging and buckling restraint so as to tailor the load-deflection curve.

Figure 12:
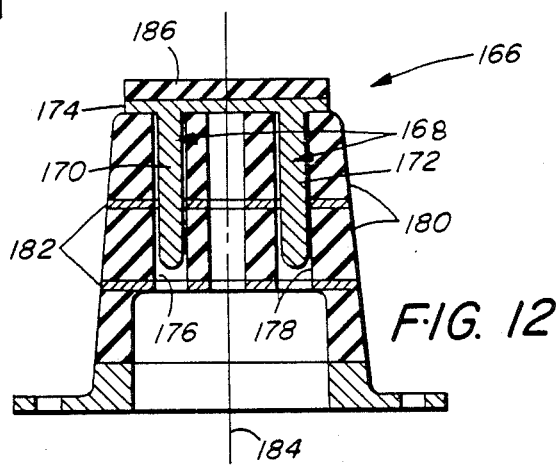
FIGS. 11, 12 and 13 are axial cross-sectional views through third, fourth and fifth embodiments, respectively, of a motion snubber in accordance with the present invention.
Figure 11:
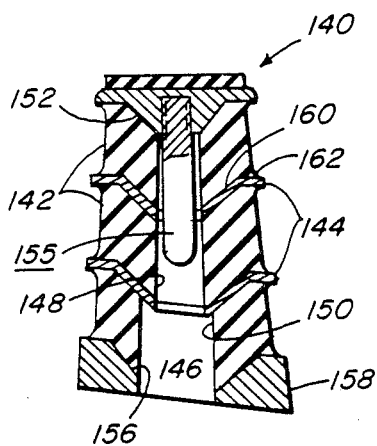
Figure 13:
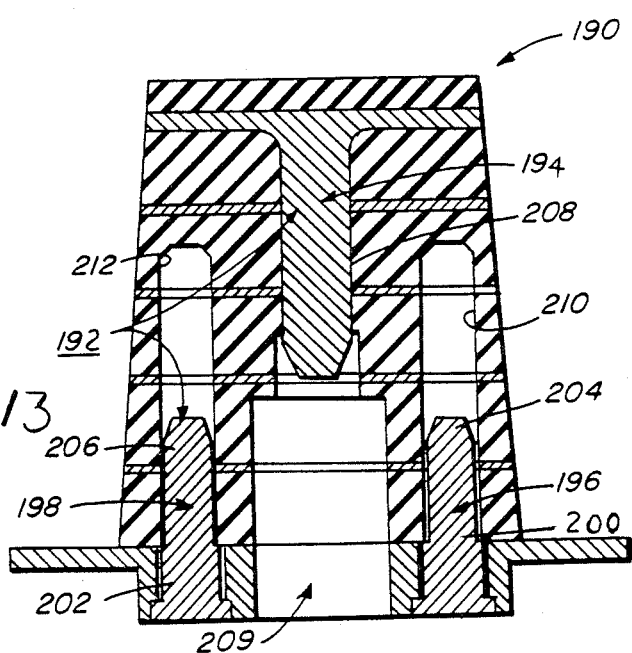

Other designs of a motion snubber are within the purview and spirit of the invention. For example, FIGS. 11, 12 and 13 show various other such designs. It should be understood, however, that various combinations of features shown in one or another figure and discussed herein or made obvious hereby can likewise be utilized in the practice of the invention. These figures shall be discussed to the extent they differ from the embodiments of FIGS. 4 and 5.

In FIG. 11 a motion snubber 140 is shown to include a plurality of formed, non-planar, layers of elastomeric and substantially inextensible materials 142, 144 forming a stack about a bore 146 having a tapered or frusto-conical upper portion 148 opening to a cylindrical lower portion 150 of larger radius. The layers 142, 144 together with bottom surface 152 of anchor plate 154 of restraining pin 155 and top surface 156 of mounting plate 158 have substantially a chevron-shaped cross-section. Specifically these features include a frusto-conical radially-inward surface 160 connected at its widest diameter (which is, for each, the topmost edge of surface 160) to an annular, radially-extending outer surface 162. A restraining pin 155 also includes a post portion 164 which threadedly engages the anchor plate 154. The shape and orientation of the chevron-shaped shims further restrain lateral buckling and bulging.

Other non-planar configurations of the shims may likewise be practiced within the scope of the invention, as will be apparent to one skilled in the art.

In FIGS. 12 and 13 a plurality of restraining pins are utilized in a single motion snubber.

In FIG. 12, the motion snubber 166 includes means 168 to restrain bulging and buckling comprising a first post 170 and a second post 172 in spaced, parallel relation to the first post. Both depend perpendicularly downwardly from an anchor plate 174 with which the first and second posts 170, 172 are integrally formed. Two bores 176, 178 are defined within layers of elastomeric material 180 and substantially inextensible material 182, each of the bores 176, 178 being disposed at a radial distance from the centerline, designated 184, of the motion snubber 166. Anchor plate 174 is bonded to and disposed adjacent to the top resilient plate 186.

In FIG. 13, a motion snubber 190 includes means 192 for restraining buckling and bulging comprising a first restraining pin 194 disposed and configured similar to the restraining pin 62A of FIG. 4, and second and third upwardly projecting restraining pins 196, 198, each having an attachment portion 200, 202 similar to attachment portion 96 of restraining pin 62B shown in FIG. 5, and a post portion 204, 206 similar to post portion 66 of restraining pin 62A shown in FIG. 4. The restraining pin 194 has a post portion 208 which partially extends and is extendable through a bore 209 of partially circular and partially rectilinear cross-section generally similar to the bore 70 shown in FIG. 8A and is substantially centrally disposed within the motion snubber 190. Post portions 204, 206 partially extend and are extendable through radially spaced, substantially parallel, cylindrical bores 210, 212 disposed in spaced, parallel relation relative to and on either side of post portion 208.

As explained hereinabove, motion snubbers designed as "add-ons" to existing rotor hub designs must meet strict motion accommodating and laod carrying requirements. These can best be explained with reference to FIGS. 14 and 15.

C. Operation

Figure 14:
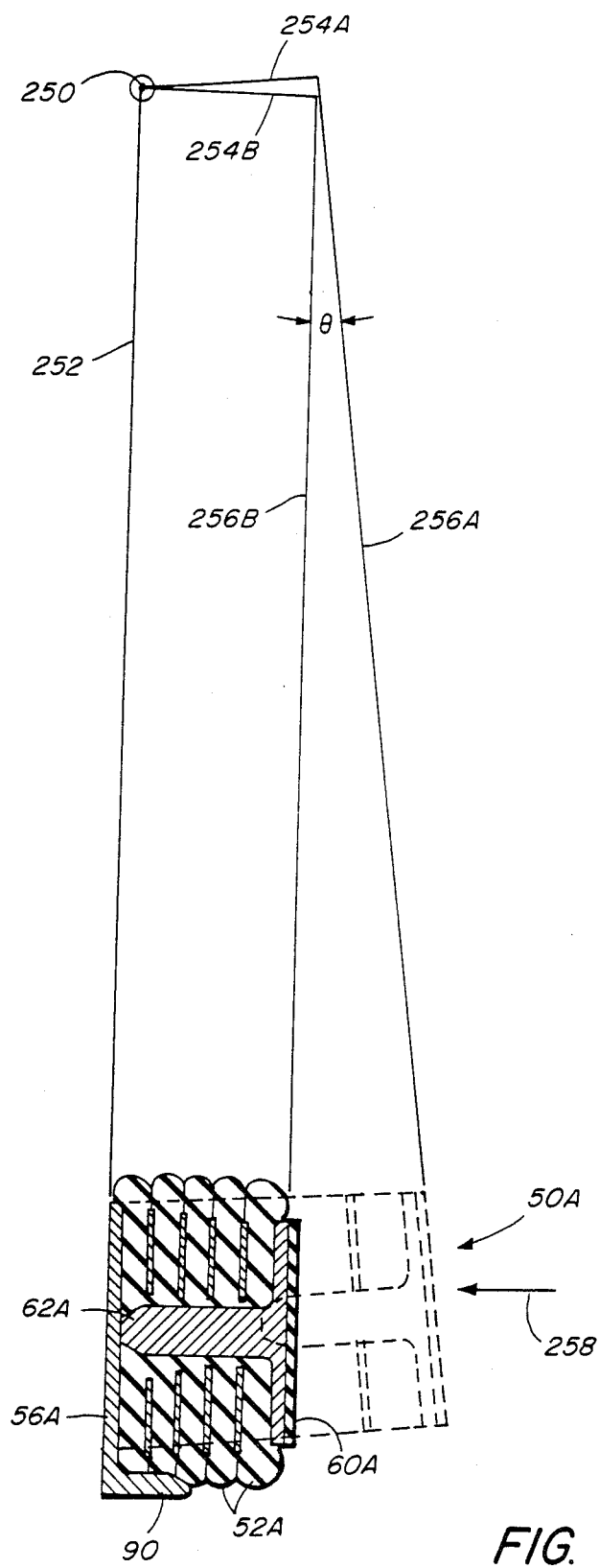
FIGS. 14 and 15 are axial cross-sectional views of the embodiments of the motion snubber shown in FIGS. 4 and 5, respectively, under compression.

FIG. 14 shows the motion snubber 50A in its fully deformed condition attained in response to a high compressive load, while in phantom is shown its unloaded height and configuration. It should be remembered from the description of FIGS. 2 and 4 that the striking plate 30A swings in an arc about a remote and offset pivot point to contact the motion snubber 50A along its load-contacting surface 60A. It is desirable that the contact be made and the compressive load applied over the full area of the load-contacting surface 60A and, therefore, the load-contacting surface 60A must be shaped, oriented and move angularly in such a way that it remains substantially parallel to the striking plate 30A over the full range from contact to full compression. As the striking plate 30A continues to swing past the initial contact angle it displaces the load-contacting surface 60A towards the mounting plate 56A through resilient deformation of the elastomer in the elastomeric layers 52A until the restraining pin 62A reaches the limit of its travel at which point the motion snubber 50A can be said to have bottomed out. As shown the restraining pin 62A is normally disposed through approximately half the stack and, thus, permits approximately a 50% compression or reduction in stack height before bottoming. Between initial contact and the fully compressed position of the motion snubber 50A the load continues to preferably be at right angles to the load contacting surface 60A. To meet this, to the extent possible, the motion snubber 50A is designed so that at full compression the load-contacting surface 60A is parallel to the mounting plate 56A which would be orthogonal to the direction of the anticipated load. Furthermore, in its unloaded state the load contacting surface is at an acute angle relative to a plane parallel to the mounting plate, being orthogonal to the direction of the anticipated load.

Diagrammatically, the pivot of the flapping motion of the striking plate 56A is disposed at point 250. A line from pivot point 250 to the mounting plate 56A extends substantially in the same plane defined by the mounting plate 56A. Accounting for an offset due to the dimensions of the structure of the rotor hub (not shown) by line 254A, 254B from the pivot 250, a perpendicular line 256A, 256B from the other end of the offset line 254A, 254B extends through the same plane defined by the load-contacting surface 60A in the unloaded position and the fully compressed position, respectively. Line 256B, as has been explained above, is substantially parallel to line 252. Line 256A forms an acute angle with respect to line 256B, which angle is preferably equal to the maximum flapping angle, theta ($\theta$).

It can be seen from the fully compressed motion snubber 50A that bulging is occurring in each of the elastomeric layers. The ends of the layers bulge out in the typical "C" shape. Bulging would likewise be occurring into the bore 70 (see FIG. 4) which is shown as being filled with elastomer when the motion snubber 50A is fully compressed. The restraining pin 62A limits bulging into the bore 70. Furthermore, since the radial width of each of the elastomeric layers 52A is considerably less than would be the full width across the motion snubber 50A were it constructed without the bore 7, a smaller volume of elastomer is being forced in the lateral direction by the compressive load. As a consequence bulging is reduced to predetermined levels in response to an anticipated load.

Buckling of the stack is likewise restrained by the restraining pin 62.

As the restraining pin 62 laces through successive elastomeric and substantially inextensible layers 52A, 54A it reacts to bulging elastomer and any bending of the stack by producing laterally directed reactant forces. These forces serve to restrain not only bulging but also buckling. It does the latter by providing what can be conceptualized as intermediate point bracing along the stack or column. This can be particularly important where the motion snubber 50A is used in applications involving a remote, offset pivot. Compressive loads applied to the non-parallel load-contacting surface 60A in a direction shown by arrow 258 can be resolved into a vertical and lateral component. The lateral component of the force is directed toward the outboard side of the motion snubber 50A, the side opposite to the one facing the pivot point 250. It causes the elastomer to attempt to flow in that direction. (This can be viewed as the elastomer being squeezed harder on the outboard side.) It would normally also promote column instability. The restraining pin 62A acts as a splint to restrain the mobility of the elastomer in this direction.

The outboard wall 90 likewise serves to restrain bulging and buckling of the stack by providing a barrier to movement in the outboard direction. As traverse or lateral deflection of the stack as a whole and/or the layers increases under load, the outboard wall 90 engages the outer peripheral surface of the stack and, as would a dam or a dike, and prevents further flow of material in that direction. The size and dimension in the lateral direction of the recess 92 shown in FIG. 4 dictates the extent of deflection permitted between the outboard wall 90 is contacted and prevents further deflection of the layer or layers so contacted, in this case shown, approximately half the stack.

Motion snubber 50A, thus, can be said to include means to restrain bulging and buckling including the restraining pin 62A and the outboard wall 90.

Consequently, the deformation of the elastomer under an anticipated load can be tailored to provide a desired level of cushioning, in combination with other functional or operational characteristics of the motion snubber such as load carrying ability.

The anticipated load to be experienced by motion snubber 50A in a helicopter rotor application as described is an intermittant one. The striking plate undergoing flapping, impacts the motion snubber, compresses it such that the impact is absorbed by the yielding system (by storage or conversion of energy) then swings away from the motion snubber and towards the one on the other side. The motion snubber resiliently decompresses to be ready for the next impact. Recovery time would be almost immediate during the long life expectancy of the motion snubber made in accordance with the invention by one skilled in the art.

While the operation of a motion snubber in accordance with the invention has been described with regard to the embodiment of FIG. 4 one skilled in the art will appreciate the operation of the other versions as well from this discussion.

Figure 15:
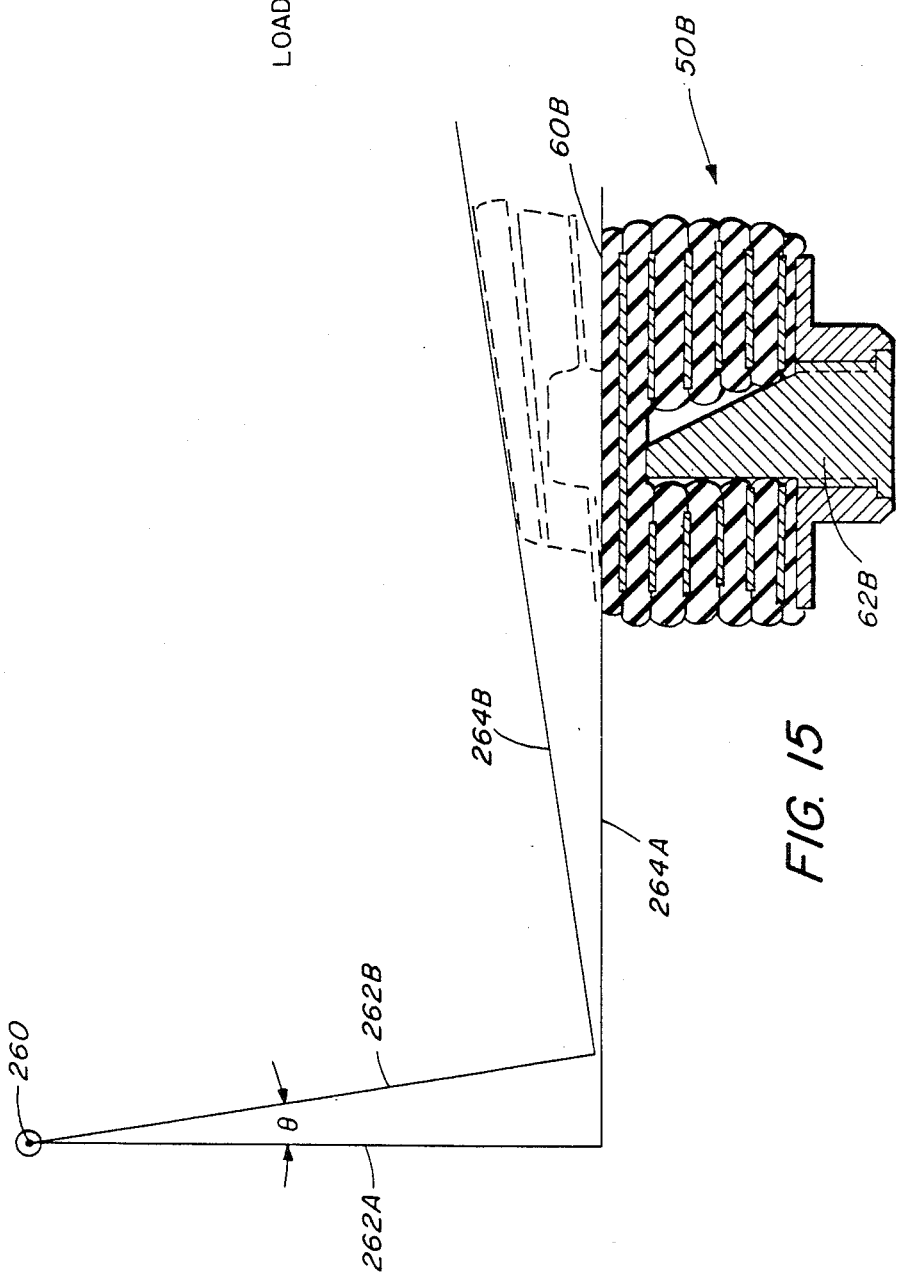

For example, and not to belabor the point, referring now to FIG. 15, the motion snubber 50B is shown in its fully compressed position and, in phantom, in its unloaded condition. The remote, offset pivot of angular motion is located at point 260 from which the offset is represented diagrammatically by lines 262A, 262B. Perpendicular lines 264A, 264B from these lines 262A and 262B extend through the load contacting surface 60B in its unloaded and its fully loaded positions, respectively. The maximum flapping angle theta (0) is substantially equal to the angle between lines 262A and 262B. In this embodiment, the lateral bulging and buckling is restrained by the restraining pin 62B as has been previously explained.

D. Load Deflection Curve

Figure 16:
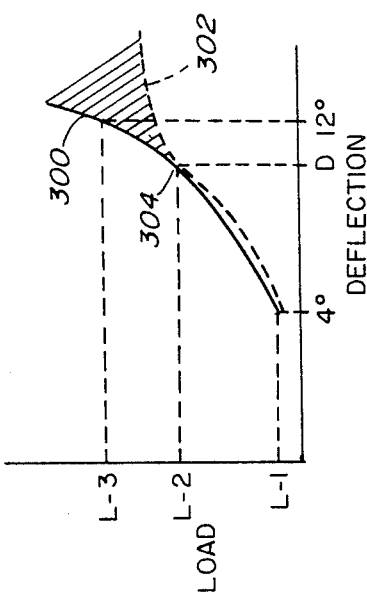
FIG. 16 is a graph showing a load-deflection curve.

FIG. 16 is a graph in which is plotted (solid line) a load-deflection curve 300 typical of a motion snubber made in accordance with the invention. Load is plotted on the vertical axis and angular deflection corresponding to the flapping angle is plotted on the horizontal axis.

The curve 300 has a constantly increasing slope between four degrees of deflection, corresponding to a load "L-1", and twelve degrees of deflection corresponding to a load "L-3".

If the characteristics of a motion snubber comprising a solid block of elastomeric material without any means to restrain deformation were plotted, the resulting curve 302 would be similar to curve 300 up to a breakpoint 304 at a load L-2 intermediate loads L-1 and L-3, and corresponding to a deflection "D" intermediate four and twelve degrees. As can be seen from curve 302, the load which such a device could carry corresponding to twelve degrees of deflection is substantially less than that of a motion snubber made in accordance with the invention. This is due, mathematically speaking, to the lower slope of curve 302 above the breakpoint 304 compared to the slope of curve 300 in this regime, and, interestingly, compared with the slope of curve 302 below the break-point 304. This degradation in performance characteristics above the break-point 304 is due to the unrestrained deformation of the elastomer and can result in shortened life expectancy.

Thus, the load carrying ability of a motion snubber at deflections between "D" and twelve degrees can be greatly improved by the incorporation of restraining means as taught hereinabove. The improvement is graphically illustrated by the shaded area between curves 300 and 302.

It should now be clear that the practice of the present invention entails a novel motion snubber and method of motion snubbing, and that these have been discussed or made obvious by the foregoing discussion. Other means and methods of practicing the invention, however, are within the spirit of the invention.

I claim:

1. A helicopter rotor comprising:
    a rotor mast having a center axis,
    a rotor hub having a striking plate which is rotatable wtih the rotor mast and which flaps about a pivot point, disposed along said center axis,
    a mounting bracket secured to said mast for rotation therewith,
    a plurality of elastomeric motion snubbers, disposed about said mast one end of each being mounted on said mast by means of said mounting bracket, and being disposed between said mounting bracket and said striking plate such that (i) in a first position of said striking plate the striking plate is in a spaced relationship relative to one of said motion snubbers, (ii) in a second position of said striking plate, the striking plate contacts said one motion snubber at a point remote from said pivot point and offset from said center axis, and (iii) in a third position of said striking plate, the striking plate compresses said one motion snubber which undergoes both height compression due to elastomeric deformation and buckling due to the direction of the load applied by said striking plate; each of said motion snubbers comprising a plurality of alternating and bonded together layers of elastomeric material and substantially inextensible material, said layers being stacked, one atop another in a first direction, each of at least some of adjoining ones of said layers defining a bore directed generally in said first direction, a mounting plate disposed at a first end of said stack and bonded to a first of said elastomeric layers, said mounting plate having means for mounting said snubber, to said mounting bracket, a head plate of resilient material disposed at a second end of said stack; a substantially rigid restraining pin extending from a position proximate one of said ends of said stack toward but not to said other end of said stack when said striking plate is in said first and second positions, said restraining pin adapted and configured to penetrate through successive openings in said adjacent layers restraining the layers under compressive loads applied to said first end of said stack by said striking plate so as to limit lateral deflection of the stack and bulging of the elastomeric layers substantially.

2. The helicopter rotor of claim 1 wherein said second end of said stack is oriented such that it forms an acute angle relative to a plane passing therethrough parallel to said first end of said stack.

3. The helicopter rotor of claim 1 wherein said restraining pin is integrally formed with and projects substantially perpendicularly from a first inextensible layer disposed adjacent to and bonded to said head plate.

4. The helicopter rotor of claim 3 wherein said restraining pin includes a substantially cylindrical post portion extending from said first inextensible layer, and having its end distal from said first inextensible layer a chamfer.

5. The helicopter rotor of claim 4 wherein at least some of said openings in said adjacent layers are not co-axially disposed and together form a bore having an effective centerline obliquely oriented relative to the centerline of the elastomeric layers.

6. The helicopter rotor of claim 4 wherein said restraining pin is disposed such that the post section extends through at least one of said openings in said adjacent layers when said snubber is unloaded, said at lest one opening being of circular cross-section, and through at least one adjacent opening when said stripping plate is in the third position, said one adjacent opening being of rectangular cross-section.

7. The helicopter rotor of claim 4 wherein said bore is formed of an oblique, frusto-conical configuration.

8. The helicopter rotor of claim 1 wherein the restraining pin has a portion of ungular configuration.

9. The helicopter rotor of claim 1 wherein the stack has a general configuration of an oblique frustum with a rectangular base and with at least a plurality of successive ones of said layers of successively smaller rectangular shape disposed such as to skew away from one side of the motion snubber.

10. The helicopter rotor of claim 1 wherein each motion snubber further comprises a restraining wall formed integrally with said mounting plate from which it extends toward to head plate along and in spaced relationship to the side of the stack which is remote from the mast.

11. The helicopter rotor of claim 1 wherein said restraining pin extends through approximately half of the stack when the striking plate is in positions (i) and (ii).

12. A motion snubber interposable between a striking plate and a base so as to cushion loads applied therebetween as a result of relative angular motion about a remote pivot point about which said striking plate swings, said motion snubber comprising:
 (a) a stack of alternating and bonded together layers of elastomeric material and substantially inextensible material, disposed one atop another about a centerline, said stack having a bore therein;
 (b) means for mounting said stack to said base including a mounting plate bonded to a first of said elastomeric layers proximate a first end of said stack, said mounting plate having a support surface distal from the stack and defining a first plane;
 (c) a resilient layer disposed at a second end of said stack and bonded thereto, said resilient layer having a planar load-contacting surface distal from said stack and defining a second plane which extends at an acute angle with respect to a plane parallel to said first plane; and
 (d) means responsive to said loads for restraining lateral buckling of said stack and bulging of at least a first plurality of elastomeric layers, said load responsive means including a restraining pin disposed within said bore in said stack, said bore having a centerline forming an acute angle with respect to the centerline of the stack with the elastomeric material disposed asymmetrically about the bore, such that more of said elastomeric material in at least some of adjacent ones of said elastomeric layers is disposed to one side of said stack, and wherein said restraining pin and bore are adapted and configured such that the side having more elastomeric materials has a larger volume of the bore into which to bulge before contacting said restraining pin.

13. A method of constructing a motion snubber comprising the steps of:
 providing a stack having in a first direction alternating and bonded together layers of elastomeric and substantially inextensible material having a bore therethrough between a rigid mounting plate and a resilient head plate, the resilient head plate disposed at an acute angle to a plane parallel to the mounting plate;
 disposing a substantially rigid restraining pin within the stack, by extending said restraining pin within said bore a first length generally in said first direction when said stack is unloaded, and a second and greater length generally in a direction forming an acute angle with respect to the first direction when said stack is loaded by a compressive load directed perpendicularly toward said resilient head plate;
 configuring the restraining pin such that it compares a portion of generally ungular configuration, and configurating said bore such that a first plurality of layers have an inner wall of substantially arcuate cross-section; whereby means are provided for restraining lateral bulging of said elastomeric layers and deflection of said stack.

14. The method of claims 13 wherein the step of providing a restraining means includes the step of configuring the restraining pin such that it comprises a portion of ungular configuration, such that the restraining pin and bore act in concert to achieve a desired degree of bulging and buckling restraint so as to tailor the load-deflection curve of the motion snubber.

15. A motion snubber comprising:
- a first plurality of alternating and bonded together respective elastomeric and inextensible layers each having a center bore and the plurality of layers having a smaller bore and a first central axis;
- a restraining pin having a base portion and a cylindrical post portion mounted atop the first plurality of layers and having the post portion extending at least partially through the smaller bore;
- a second plurality of alternating and bonded together respective elastomeric and inextensible layers each having a center bore and the plurality of layers having a larger bore; said second plurality of layers bonded to the first plurality of layers such that the smaller and larger bores are partially aligned; and,
- a resilient layer disposed atop of the restraining pin base portion and a mounting plate disposed at the free end of the second plurality of layers such that post portion of the restraining pin extends into the larger bore of the second plurality of layers upon compression of the motion snubber, the centerlines of the smaller and larger bores being oblique to one another.

16. A motion snubber having a centerline and comprising:
- a stack of alternating and bonded together elastomeric and inextensible layers having a cylindrical bore at least partially therethrough and having a mounting plate at one end and a resilient head plate at the other end, the resilient head plate being at an angle to a plane parallel to the mounting plate;
- a substantially rigid restraining pin comprising a base portion and a post portion extending partially within the partial bore; said post portion having an ungular portion extending at least partially into the bore; and the centerline of the cylindrical bore being oblique with respect to the centerline of the motion snubber.

* * * * *